(12) United States Patent
Godil et al.

(10) Patent No.: US 8,280,218 B2
(45) Date of Patent: *Oct. 2, 2012

(54) OPTICAL ATTENUATOR

(75) Inventors: Asif A. Godil, Milpitas, CA (US);
Kenneth Honer, Santa Clara, CA (US);
Matthew Lawrence, San Francisco, CA (US); Eric Gustafson, Palo Alto, CA (US)

(73) Assignee: NeoPhotonics Corporation, San Jose, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 12/496,903

(22) Filed: Jul. 2, 2009

(65) Prior Publication Data

US 2010/0003003 A1    Jan. 7, 2010

Related U.S. Application Data

(63) Continuation of application No. 11/401,185, filed on Apr. 10, 2006, now Pat. No. 7,574,096.

(51) Int. Cl.
*G02B 6/00* (2006.01)
*G02B 6/26* (2006.01)
*G02B 6/32* (2006.01)

(52) U.S. Cl. ............... 385/140; 385/18; 385/33; 385/50

(58) Field of Classification Search .................... 385/15, 385/16, 18, 19, 23, 25, 27, 31, 33, 39, 50, 385/140
See application file for complete search history.

(56) References Cited

U.S. PATENT DOCUMENTS

| | | | |
|---|---|---|---|
| 6,522,801 B1 | 2/2003 | Aksyuk et al. | |
| 6,628,882 B2 | 9/2003 | Vaganov et al. | |
| 6,704,475 B2 | 3/2004 | Jin et al. | |
| 6,718,114 B2 | 4/2004 | Hong et al. | |
| 6,915,061 B2 * | 7/2005 | Li et al. | 385/140 |
| 6,947,657 B1 | 9/2005 | Chen et al. | |
| 7,006,273 B2 | 2/2006 | Sahashi et al. | |
| 7,015,056 B2 | 3/2006 | Gasparyan et al. | |
| 7,085,064 B2 | 8/2006 | Uzawa et al. | |
| 7,295,748 B2 * | 11/2007 | Chen et al. | 385/140 |
| 7,522,808 B2 * | 4/2009 | Wang et al. | 385/140 |
| 2004/0008967 A1 * | 1/2004 | Chu et al. | 385/140 |
| 2005/0225872 A1 | 10/2005 | Uzawa et al. | |
| 2007/0031104 A1 | 2/2007 | Chen et al. | |

* cited by examiner

*Primary Examiner* — Uyen Chau N Le
*Assistant Examiner* — John M Bedtelyon
(74) *Attorney, Agent, or Firm* — Dardi & Herbert, PLLC

(57) ABSTRACT

A tilting mirror MEMS variable optical attenuator attenuates light over a band of wavelengths with minimum wavelength dependent loss. The attenuator includes a lens that has a wedged input face and is made from a material that has high dispersion. The lens design causes different wavelengths to travel different paths through the attenuator such that wavelength dependent loss is reduced. The attenuator may be designed to have minimum wavelength dependent loss at a specified attenuation greater than zero.

20 Claims, 12 Drawing Sheets

SIDE VIEW

SIDE VIEW

FIG. 1A

TOP VIEW

OPTICAL ATTENUATOR

CROSS-REFERENCE TO RELATED APPLICATIONS

This is a continuation of U.S. patent application Ser. No. 11/401,185 to Godil et al., entitled "OPTICAL ATTENUATOR" filed Apr. 10, 2006 now U.S. Pat. No. 7,574,096, which is hereby incorporated by reference.

TECHNICAL FIELD

The invention relates generally to optical devices. In particular it relates to optical attenuators in fiber optic systems.

BACKGROUND

Fiber optics refers to the technical art of transmitting light from place to place over a thin strand of glass known as an optical fiber. Optical fibers can carry light over great distances with little loss. Optical fibers are also flexible and allow light to be directed around corners, for example, without the use of mirrors.

A most important application of fiber optics is in telecommunications where voice signals or internet data may be carried by light traveling through optical fibers. An optical fiber is capable of carrying much more information than a copper wire. The rise of the internet especially has driven demand for more communications capacity and more fiber optic systems.

Fiber optic systems include many types of components to perform functions such as converting data into light signals, amplifying or attenuating light signals, and combining several signals on one fiber. Optical attenuators are devices that reduce the power of light in a fiber. The amount of attenuation in a variable optical attenuator is easily adjustable, for example by electronic control.

Optical attenuators are used for power management, equalization among different wavelength channels, gain control in amplifiers, overload protection and other tasks. It is convenient to include variable optical attenuators in a fiber optic system in order to easily adjust light power in various parts of the system.

Modern fiber optic systems carry several different colors or wavelengths of light simultaneously. Each wavelength channel may be dedicated to its own stream of optical data. This method, known as wavelength division multiplexing, allows more data to be carried on a single fiber than if only one wavelength is used.

When an optical attenuator is used in a fiber optic system that operates with several wavelengths simultaneously it is desirable for the amount of attenuation to be the same for each wavelength.

It has become quite popular to use micro-electro-mechanical systems (MEMS) in conjunction with fiber optics to build variable optical attenuators (VOAs). Many MEMS VOAs are based on tilting mirror technology. An input fiber and an output fiber are arranged so that a tiny mirror reflects light from one to the other. When the mirror is tilted the amount of light that is transferred between the fibers is reduced because the reflected light partially misses the output fiber.

Tilting mirror MEMS VOAs have been quite successful; their technical characteristics are not ideal, however. A key problem with conventional MEMS VOAs is that as the amount of attenuation is increased it becomes unequal for different wavelengths. The attenuation depends on wavelength.

Wavelength dependent loss (WDL) is a measure of the difference in attenuation at different wavelengths for an optical attenuator. As an example, consider an optical attenuator that works at wavelengths in the range between 1.53 μm and 1.57 μm and is operating at an average attenuation of 10 dB. If the actual attenuation is 9.75 dB at 1.53 μm and increases to 10.25 dB at 1.57 μm, then the WDL over the range 1.53 μm to 1.57 μm is 0.5 dB (10.25−9.75=0.5) when the average attenuation is 10 dB.

In conventional VOAs the WDL increases as the level of attenuation increases. In other words, continuing the example above, the difference in attenuation at 1.53 μm versus 1.57 μm becomes greater as the overall or average attenuation increases. As the overall attenuation increases to 20 dB, for example, the WDL might increase to 1.0 dB.

It would be desirable to have a tilting mirror MEMS VOA with as small WDL as possible over a wide range of operating wavelengths and attenuation levels. Even if it not possible to eliminate WDL at all attenuations, it would still be very useful to reduce WDL wherever possible. For example, it would be desirable to minimize WDL at 5, 10, 15 dB or any other attenuation at the option of the attenuator designer.

DETAILED DESCRIPTION

Fiber optic communications systems employing wavelength division multiplexing (WDM) feature increased transmission capacity compared to single-wavelength systems. Variable optical attenuators are an important component of WDM systems because they enable operators to control optical power levels. Wavelength dependent loss (WDL), or the extent to which VOA attenuation varies with wavelength, is an important VOA design parameter. Designing a tilting mirror MEMS VOA with minimum WDL has been an elusive goal.

The size of the optical mode in an optical fiber depends on the wavelength of the light. This dispersion of fiber optic mode size is the primary source of WDL in tilting mirror MEMS VOAs. It is possible, however, to design a novel VOA that partially compensates for the effect of fiber optic mode dispersion and features reduced WDL.

Figure 1A:
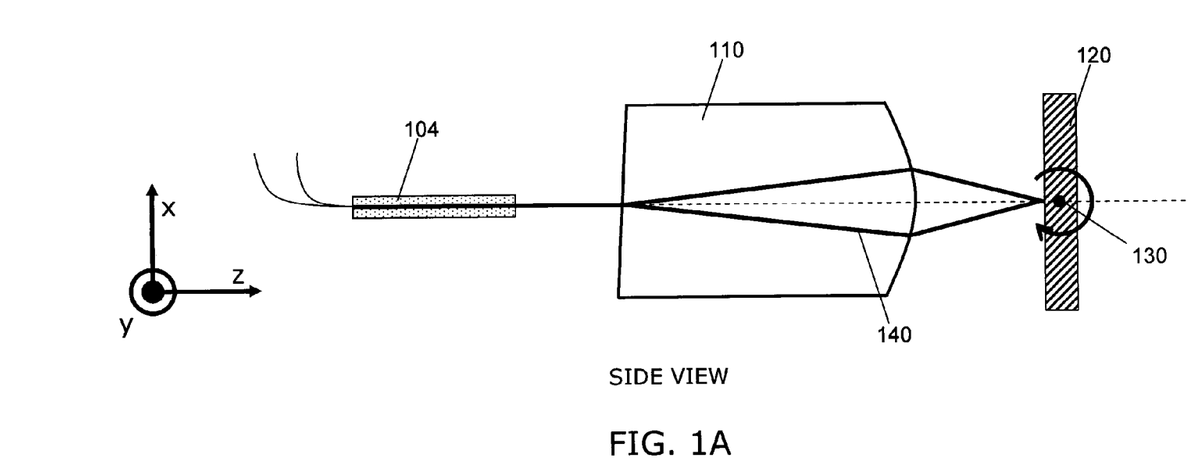
FIGS. 1A and 1B show schematically side and top views, respectively, of a tilting mirror MEMS VOA in a low-loss state.
Figure 1B:
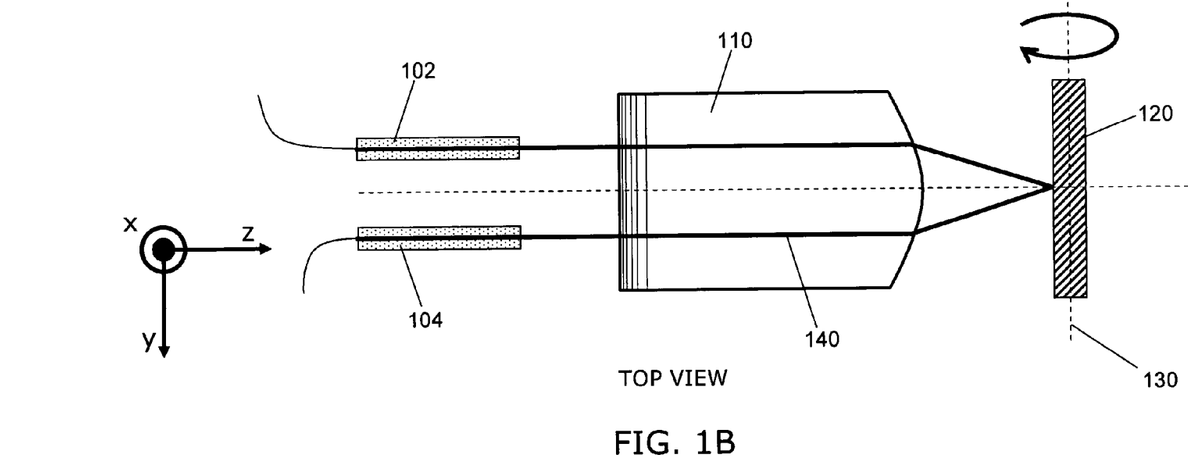

FIGS. 1A and 1B show schematically side and top views respectively of a tilting mirror MEMS VOA in a low-loss state. In the FIGS. 102 and 104 are fiber pigtails, 110 is a short focal length lens, and 120 is a tilting MEMS mirror that rotates about axis 130.

Pigtails 102 and 104 are drawn as separate items for ease of discussion, but in an actual device they are usually contained in a single, two-fiber pigtail. Pigtail 102 is not visible in FIG. 1A because it is hidden behind pigtail 104. Lens 110 may be any short focal length lens, but conventional VOA designs commonly use a graded-index (GRIN) lens for this application. MEMS mirror 120 may be tilted or rotated about axis 130 by applying a voltage to the mirror.

Pigtails 102 and 104 are drawn lying in the y-z plane of the figures and this is a preferred configuration; however, it is possible to arrange the pigtails so that they lie in the x-z plane without changing the principles of operation of the VOA.

In FIGS. 1A and 1B, line 140 represents the path that a beam of light follows as it propagates from fiber pigtail 104 through lens 110, is reflected by mirror 120, re-enters lens 110, and finally enters fiber pigtail 102. The direction of propagation is unimportant; either fiber may be considered as a light source or a light receiver and either fiber may be denoted the "first" or "second" fiber. FIGS. 1A and 1B show schematically a low-loss state of the tilting mirror MEMS VOA because light from a first fiber propagates through the system to a second fiber essentially unimpeded.

Figure 2A:
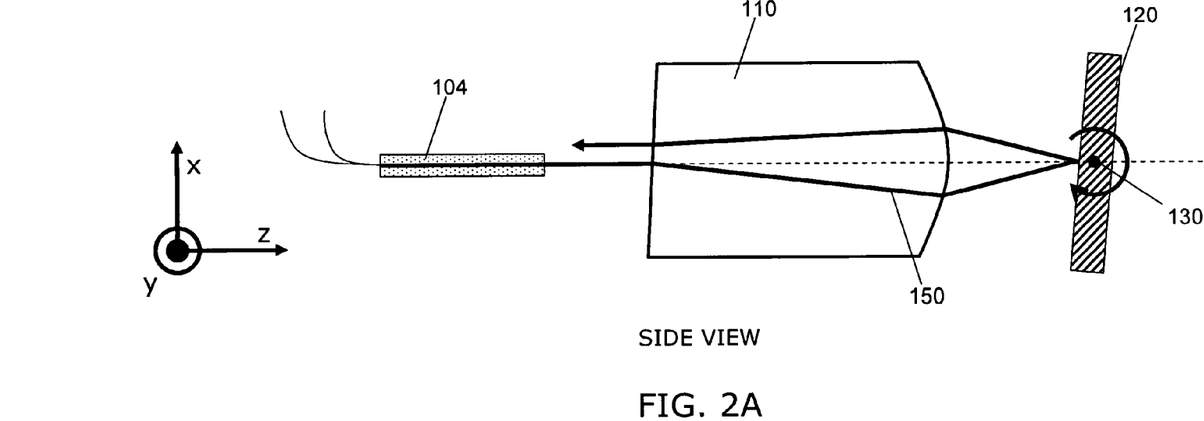
FIGS. 2A and 2B show schematically side and top views, respectively, of a tilting mirror MEMS VOA in an attenuating state.
Figure 2B:
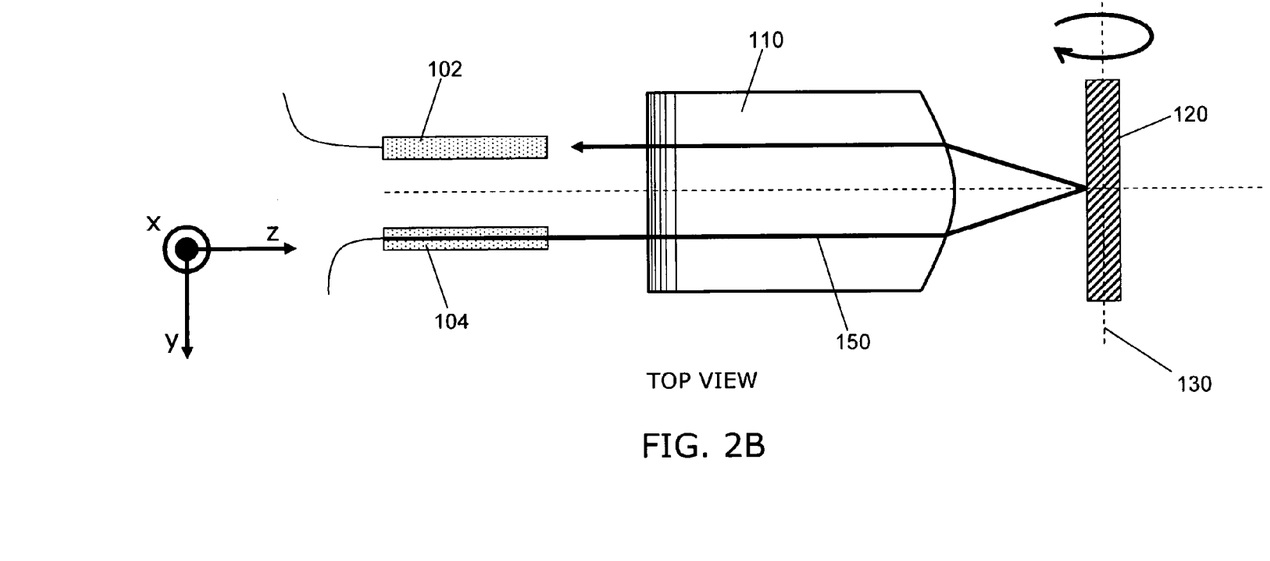

FIGS. 2A and 2B show schematically side and top views respectively of a tilting mirror MEMS VOA in an attenuating state. Mirror 120 has been rotated about axis 130. In FIGS. 2A and 2B, line 150 represents the path that a beam of light follows as it propagates from fiber pigtail 104 through lens 110, is reflected by mirror 120, re-enters lens 110, and finally propagates toward fiber pigtail 102.

The difference between path 150 in FIGS. 2A and 2B, and path 140 in FIGS. 1A and 1B is that path 150 is slightly offset when it approaches pigtail 102. The offset is a consequence of the rotation of mirror 120. Light traveling along an offset path does not couple into a fiber as efficiently as light traveling along a path coinciding with the axis of the fiber.

Figure 3:
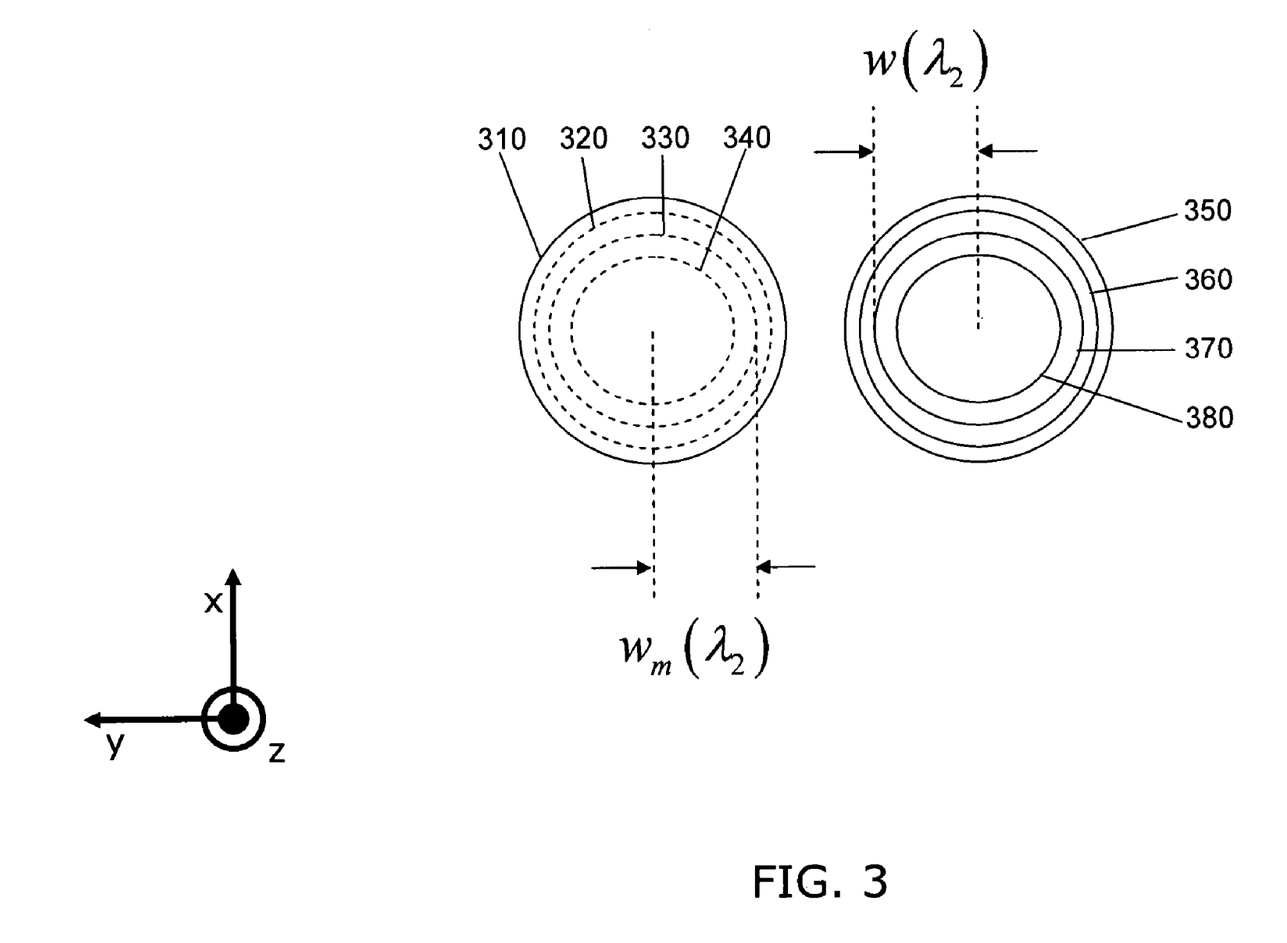
FIG. 3 shows schematically optical spot and fiber mode sizes for various wavelengths in a tilting mirror MEMS VOA in a low-loss state.

FIG. 3 shows schematically optical spot and fiber mode sizes for various wavelengths in a tilting mirror MEMS VOA in a low-loss state. In FIG. 3 circle 310 represents the core of an optical fiber such as the fiber in pigtail 104 of FIGS. 1A, 1B, 2A and 2B. Dashed circles 320, 330 and 340 represent the sizes of optical modes in the fiber for different wavelengths. For example, dashed circle 330 represents the mode diameter $w_m$ at wavelength $\lambda_2$. In general mode diameter refers to the diameter where the optical power is $1/e^2$ of its maximum value, but any other consistent definition of mode diameter may be adopted. Mode cross-sections are drawn as circles for convenience, but may have other shapes such as ovals, etc.

Circle 350 represents the core of an optical fiber such as the fiber in pigtail 102 of FIGS. 1B and 2B (hidden in FIGS. 1A and 2A). Circles 360, 370 and 380 represent the spot sizes of optical beams of different wavelengths arriving at the fiber. For example, circle 370 represents the spot size w at wavelength $\lambda_2$. In FIG. 3 the spot sizes 360, 370, 380 for various wavelengths of light arriving the second fiber in a VOA match the mode sizes of that fiber.

In the low-loss state of a tilting mirror MEMS VOA the spot size of free propagating light matches the fiber mode size of the input and output fibers. Furthermore, the optical spots are centered on and overlap the fiber modes.

Figure 4:
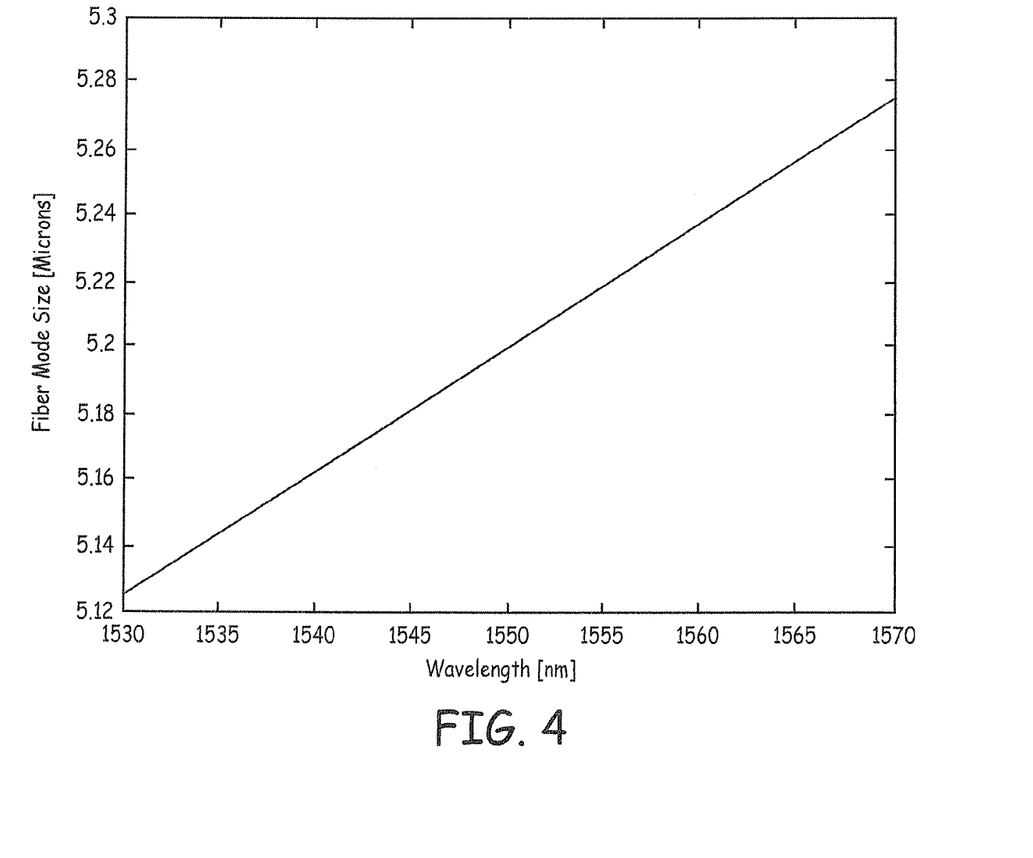
FIG. 4 is a graph of fiber mode size versus wavelength.

FIG. 4 is a graph of fiber mode size versus wavelength. In the graph, the mode size for a typical optical fiber is plotted versus the wavelength of light traveling in the fiber. Over the wavelength range from 1530 nm to 1570 nm the mode size varies from approximately 5.125 μm to approximately 5.275 μm. This variation of mode size with wavelength leads to WDL in a tilting mirror MEMS VOA.

Figure 5:
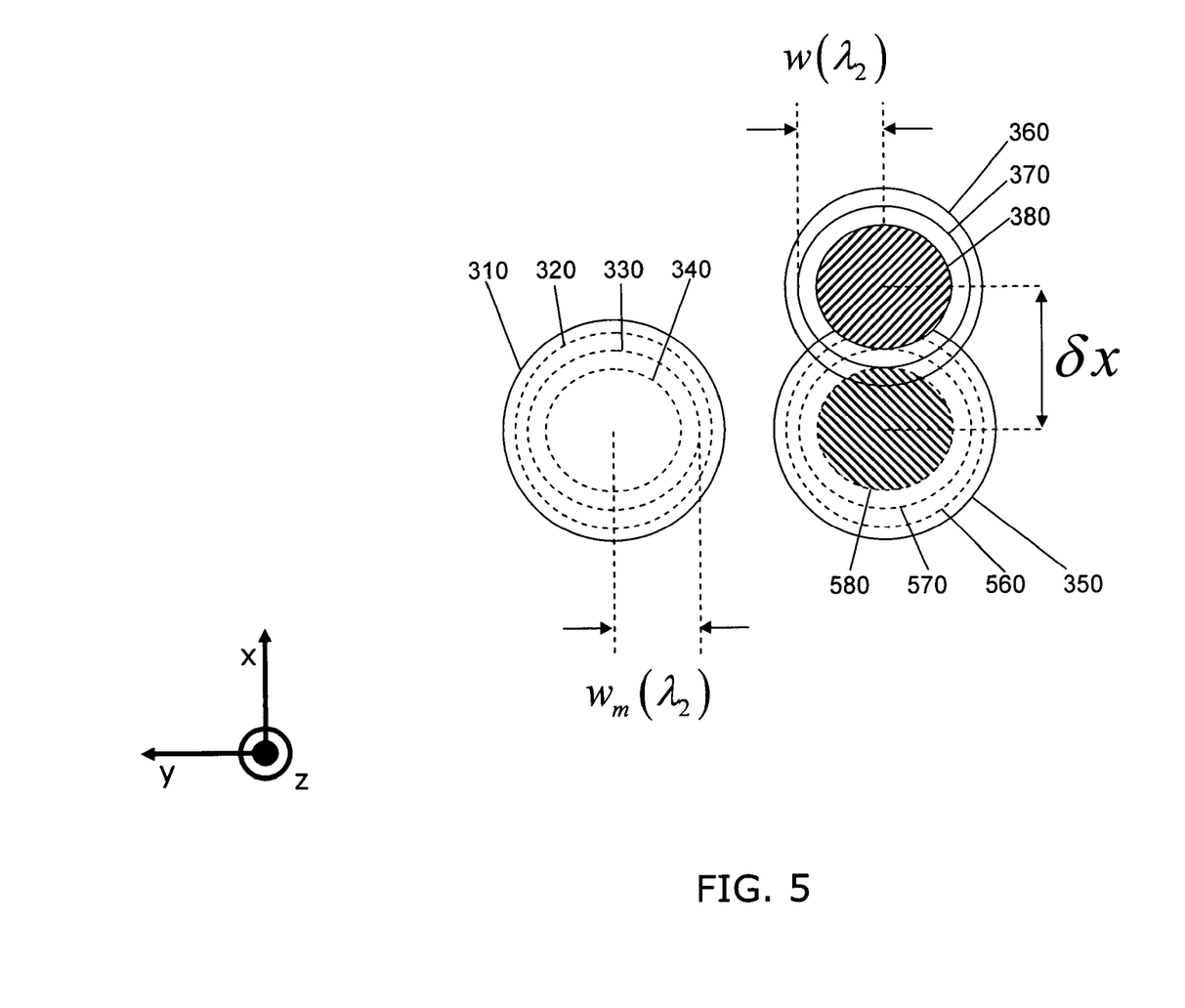
FIG. 5 shows schematically optical spot and fiber mode sizes for various wavelengths in a tilting mirror MEMS VOA in an attenuating state.

FIG. 5 shows schematically optical and fiber mode sizes for various wavelengths in a tilting mirror MEMS VOA in an attenuating state. In FIG. 5 circle 310 represents the core of an optical fiber such as the fiber in pigtail 104 of FIGS. 1A, 1B, 2A and 2B. Dashed circles 320, 330 and 340 represent the sizes of optical modes in the fiber for different wavelengths. For example, dashed circle 330 represents the mode diameter $w_m$ at wavelength $\lambda_2$.

Circle 350 represents the core of an optical fiber such as the fiber in pigtail 102 of FIGS. 1B and 2B (hidden in FIGS. 1A and 2A). Circles 360, 370 and 380 represent the spot sizes and positions of optical beams of different wavelengths arriving at the fiber. For example, circle 370 represents the spot size w at wavelength $\lambda_2$.

In FIG. 5 the spot sizes 360, 370, 380 for various wavelengths of light arriving the second fiber in a VOA match the mode sizes of that fiber; however, they are not aligned with the positions of the modes of the fiber. Fiber modes for wavelengths corresponding to spots 360, 370 and 380 are represented by dashed circles 560, 570 and 580 respectively. The spots and their corresponding modes are offset by a distance $\delta x$.

In FIG. 5 spot 380 and corresponding fiber mode 580 have been filled in with hatching for ease of discussion. It is apparent from the figure that while spot 360 and mode 560 overlap somewhat, spot 380 and mode 580 do not overlap. Therefore the attenuation at the wavelength corresponding to spot 380 is greater than that at the wavelength corresponding to spot 360. The attenuation varies with wavelength; this is the primary source of wavelength dependent loss (WDL).

Figure 6:
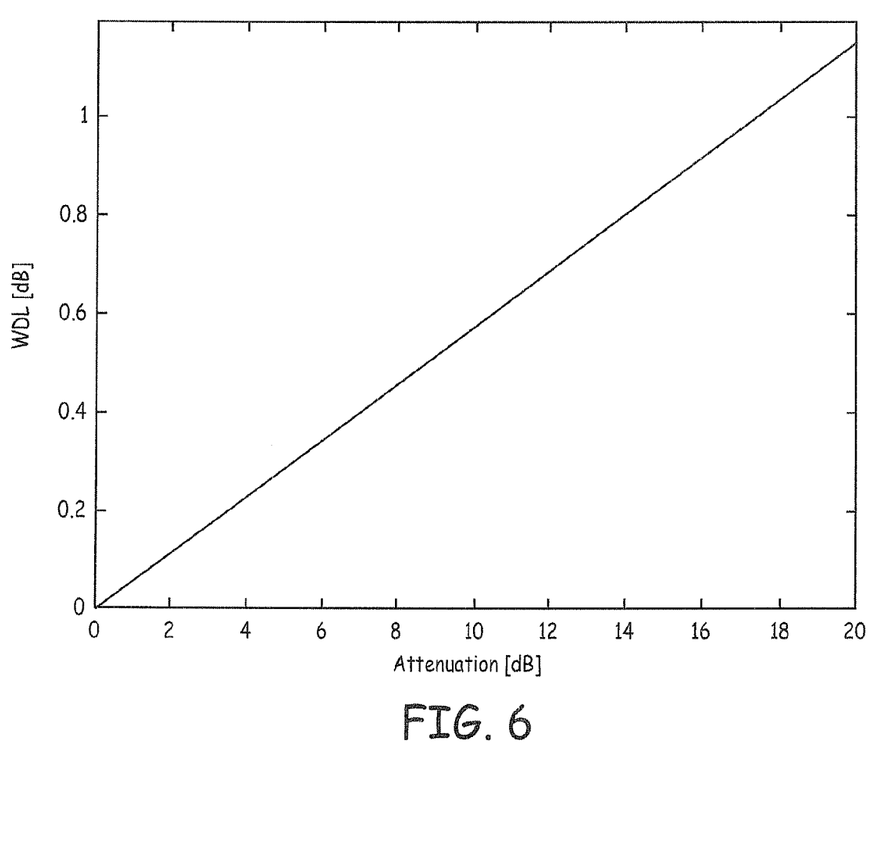
FIG. 6 is a graph of WDL versus attenuation for a conventional tilting mirror MEMS VOA.

FIG. 6 is a graph of WDL versus attenuation for a tilting mirror MEMS VOA. Over the range of attenuation from 0 dB to 20 dB the WDL varies from 0 dB to approximately 1.25 dB. The WDL steadily increases with attenuation.

In order to design a VOA with reduced WDL it is helpful to analyze the coupling between optical spots (spatial modes) and fiber modes in detail. Considering a (large radius of curvature) Gaussian beam, the coupling efficiency, $\epsilon$, of a spatial mode of spot size w aligned with a fiber mode of size $w_m(\lambda)$ is given by:

$$\varepsilon = \frac{P_{Coupled}}{P_{Incident}} = \frac{4}{\left[\frac{w^2(\lambda)}{w_m^2(\lambda)} + \frac{w_m^2(\lambda)}{w^2(\lambda)}\right]^2}.$$

When the optical spot is offset from the fiber mode center by a distance $\delta x$, the coupling efficiency becomes:

$$\varepsilon = \frac{4}{\left[\frac{w^2(\lambda)}{w_m^2(\lambda)} + \frac{w_m^2(\lambda)}{w^2(\lambda)}\right]^2} \exp\left[-\left(\frac{2}{w^2(\lambda) + w_m^2(\lambda)}\right)\delta x^2\right].$$

For high coupling efficiency in the unattenuated state, it is necessary to design the optical system so that the optical spot size and the fiber mode size are closely matched at the plane where the light enters the fiber. Therefore, in practice, the first term in the coupling efficiency is near unity and the expression becomes, approximately:

$$\varepsilon(\lambda) \approx \exp\left[-\left(\frac{\delta x^2}{w_m^2(\lambda)}\right)\right].$$

This expression shows that the coupling efficiency is wavelength dependent since $w_m(\lambda)$ is a function of $\lambda$. The attenuation is related to the coupling efficiency by:

$$A(\lambda) = 10 \log_{10}[\varepsilon(\lambda)].$$

The fiber mode size variation (see FIG. 4) for a narrow range of wavelengths has a small term linear in wavelength which may be written:

$$w_m(\lambda) \approx w_m(\lambda_0) + \frac{dw_m}{d\lambda}\bigg|_{\lambda=\lambda_0}(\lambda-\lambda_0) =$$

$$w_m(\lambda_0) + b(\lambda-\lambda_0) \approx 5.2 + 3.7 \times 10^{-3}(\lambda-1550).$$

The last approximation is useful in the optical C band which extends from approximately 1530 nm to approximately 1570 nm.

The coupling efficiency with explicit wavelength dependence may now be written as:

$$\varepsilon(\lambda) \approx \exp\left\{-\left[\frac{\delta x}{w_m(\lambda_0)+b(\lambda-\lambda_0)}\right]^2\right\} = \exp\left\{-\left[\frac{\delta x/w_m(\lambda_0)}{1+\frac{b}{w_m(\lambda_0)}(\lambda-\lambda_0)}\right]^2\right\}.$$

It is possible to partially compensate the wavelength dependent term in the denominator of the argument of the exponential by adding an additional wavelength dependent term to the displacement $\delta x$ to obtain:

$$\frac{\delta x}{w_m(\lambda_0)} + \frac{a}{w_m(\lambda_0)}(\lambda-\lambda_0).$$

The modified argument can be approximated to first order in $(\lambda-\lambda_0)$:

$$y = \frac{\left[\frac{\delta x}{w_m(\lambda_0)} + \frac{a}{w_m(\lambda_0)}(\lambda-\lambda_0)\right]}{\left[1 + \frac{b}{w_m(\lambda_0)}(\lambda-\lambda_0)\right]} \approx$$

$$\frac{\delta x}{w_m(\lambda_0)} + \left[\frac{a}{w_m(\lambda_0)} - \frac{\delta x}{w_m(\lambda_0)}\frac{b}{w_m(\lambda_0)}\right](\lambda-\lambda_0).$$

Substituting back into the attenuation formula:

$$\varepsilon(\lambda) \approx \exp\left\{-\left[\frac{\delta x}{w_m(\lambda_0)} + \left[\frac{a}{w_m(\lambda_0)} - \frac{\delta x}{w_m(\lambda_0)}\frac{b}{w_m(\lambda_0)}\right](\lambda-\lambda_0)\right]^2\right\}.$$

For a given $\delta x$ (and corresponding attenuation) there is a value of 'a' which satisfies:

$$\frac{a}{w_m(\lambda_0)} - \frac{\delta x}{w_m(\lambda_0)}\frac{b}{w_m(\lambda_0)} = 0$$

and thus cancels the wavelength dependence.

This expression may be solved for 'a':

$$a = \frac{\delta x}{w_m(\lambda_0)}b.$$

This value for 'a' makes the WDL zero at the attenuation corresponding to $\delta x$.

The attenuation, A, is then:

$$A = -10\log_{10}(\varepsilon) = -10\log_{10}\left[\exp\left(-\frac{\delta x^2}{w_m^2}\right)\right] = -10\log(e)\left(\frac{\delta x^2}{w_m^2}\right).$$

Now, solving for $w_m/\delta x$ and substituting into the expression for 'a', we find:

$$a = \sqrt{\frac{A}{4.343}}\, b.$$

This means that the WDL at attenuation A can be minimized by selecting a value for 'a' that satisfies the expression above.

Figure 7:
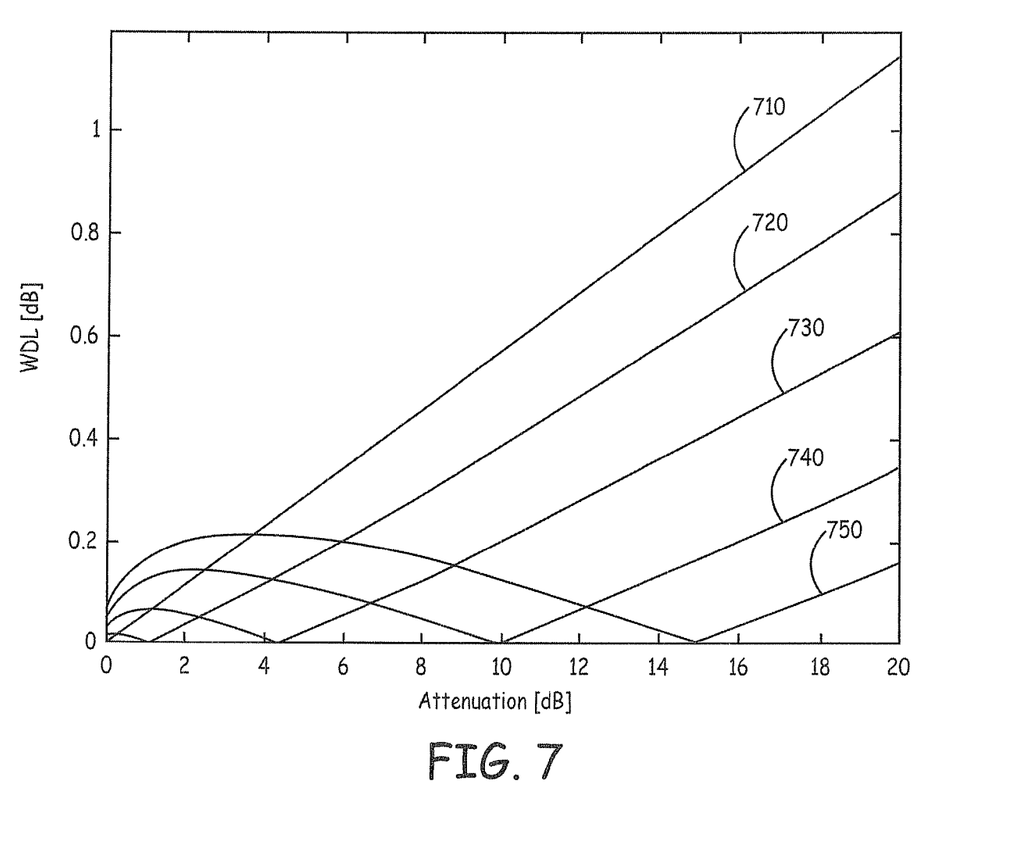
FIG. 7 shows graphs of WDL versus attenuation for various ratios of "a" and "b" parameters.

FIG. 7 shows graphs of WDL as a function of attenuation for several values of 'a'. For a given compensation value, 'a', the WDL has a local minimum at an attenuation greater than zero. 'a' is a function of the material dispersion, the wavelength range over which the attenuation dependence is to be compensated, and the wedge angle of the lens input face.

In FIG. 7 graphs of WDL versus attenuation for various ratios of "a" and "b" parameters are shown. Plots 710, 720, 730, 740 and 750 correspond to a=0, a=b/2, a=b, a=3b/2, and a=1.85b respectively. It is apparent from FIG. 7 that by choosing a desirable value for "a", a VOA designer can greatly reduce WDL and even achieve zero WDL for at least one attenuation level greater than zero attenuation. Plots 720, 730, 740 and 750 represent VOA designs in which minimum WDL is achieved at approximately 1, 4.5, 9.5 and 15 dB respectively.

In practice, a wavelength dependent offset, a, may be added to the position of the return beam through the design of the lens in the optical attenuator.

The value of a may be varied through the dispersion of the lens material and through the angle of the flat face of the lens. Through Snell's law, these parameters will add a wavelength dependent shift to the position of the return beam.

Figure 8A:
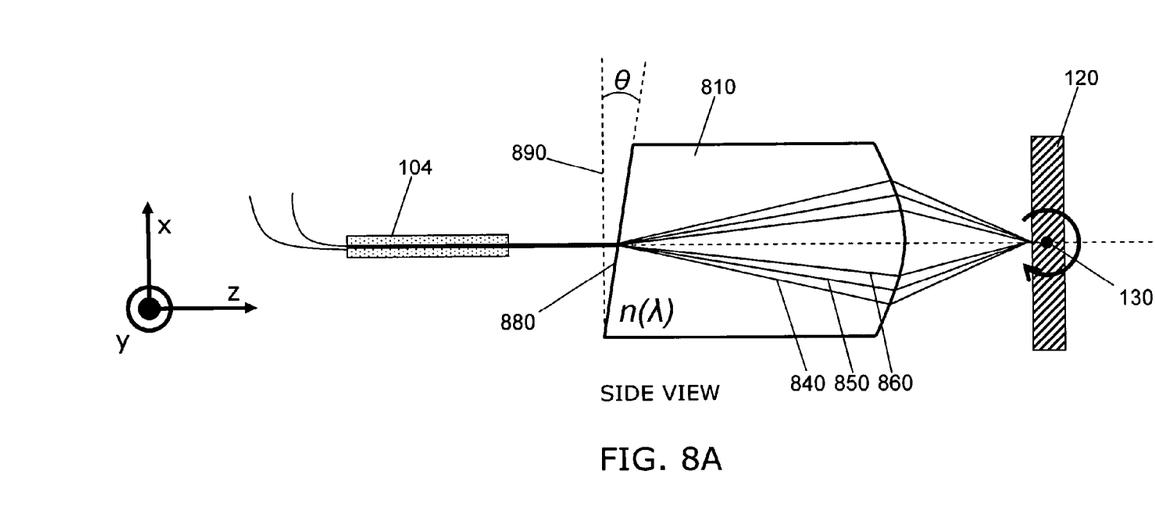
FIGS. 8A and 8B show schematically side views of a WDL-compensated tilting mirror MEMS VOA in a low-loss state and an attenuating state respectively.
Figure 8B:
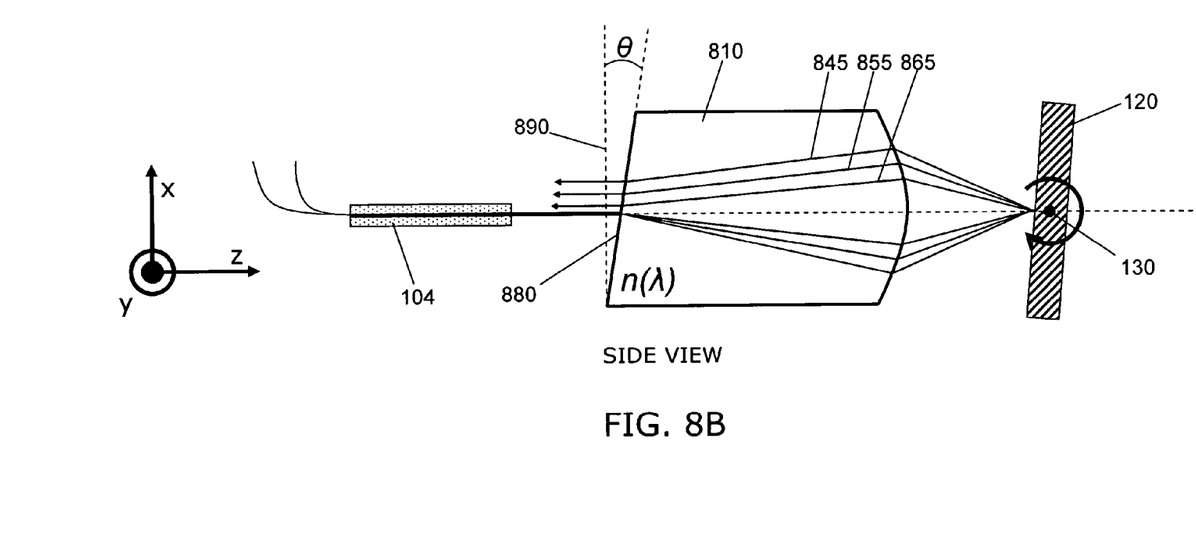

FIGS. 8A and 8B show schematically side views of a WDL-compensated tilting mirror MEMS VOA in a low-loss state and attenuating state respectively. As shown in FIGS. 1A and 2A, in FIGS. 8A and 8B items 104 and 120 are a fiber pigtail (fiber pigtail 102 is hidden) and a tilting MEMS mirror that rotates about axis 130.

In FIG. 8A, lines 840, 850 and 860 represents the path that various wavelengths in a beam of light follow as they propagate from fiber pigtail 104 through lens 810, are reflected by mirror 120, re-enter lens 810, and finally enter fiber pigtail 102 (hidden). The direction of propagation is unimportant; either fiber may be considered as a light source or a light receiver.

FIG. 8A shows schematically a low-loss state of a tilting mirror MEMS VOA because light from one fiber propagates through the system to the second fiber essentially unimpeded.

FIG. 8B shows schematically an attenuating state of a tilting mirror MEMS VOA. Mirror 120 has been rotated about axis 130. In FIG. 8B, lines 845, 855 and 865 represent the paths that various wavelengths in a beam of light follow as they propagate from fiber pigtail 104 through lens 810, are reflected by mirror 120, re-enter lens 810, and finally propagate toward fiber pigtail 102.

The difference between paths 840, 850, 860 in FIG. 8A, and paths 845, 855, 865 in FIG. 8B is that paths 845, 855, 865 are slightly offset when they approach pigtail 102. The offset is a consequence of the rotation of mirror 120. Light traveling along an offset path does not couple into a fiber as efficiently as light traveling along a path coinciding with the axis of the fiber.

Furthermore, the amount by which each of paths 845, 855, 865 are offset is a function of the wavelength of light in each path. The wavelength dependence of the offset is a consequence of the design of lens 810.

Lens 810 is designed to produce a wavelength dependent shift in the position of the spot entering the second fiber. Lens 810 is made from a material whose refractive index, $\eta(\lambda)$, depends strongly on wavelength; i.e. it has high material dispersion. Lens 810 also has an input face 880 that forms a wedge angle, $\theta$, with respect to a plane 890 that is perpendicular to the lens axis. At surface 880 various wavelengths in the incoming light beam are dispersed in angle as predicted by Snell's law and travel at different angles with respect to the axis of the lens. These rays travel to the curved output face of the lens where they are further dispersed in angle so that they arrive at the MEMS mirror with different incidence angles.

Figure 9:
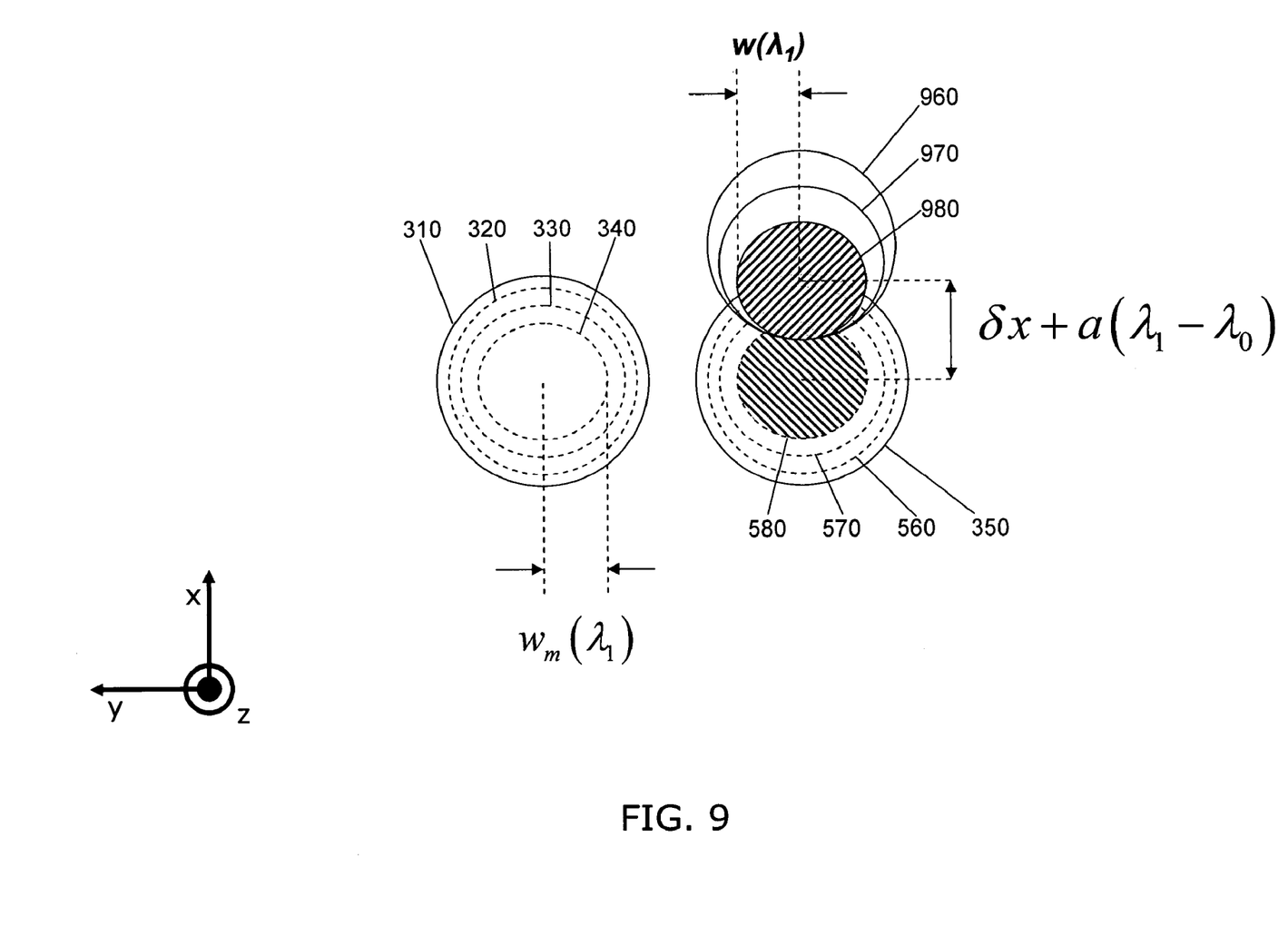
FIG. 9 shows schematically optical spot and fiber mode sizes for various wavelengths in a WDL-compensated tilting mirror MEMS VOA in an attenuating state.

FIG. 9 shows schematically optical spot and fiber mode sizes for various wavelengths in a WDL-compensated tilting mirror MEMS VOA in an attenuating state. In FIG. 9 circle 310 represents the core of an optical fiber such as the fiber in pigtail 104 of FIGS. 1A, 1B, 2A, 2B, 8A and 8B. Dashed circles 320, 330 and 340 represent the sizes of fiber modes for different wavelengths. For example, dashed circle 340 represents the fiber mode diameter $w_m$ at wavelength $\lambda_l$.

Circle 350 represents the core of an optical fiber such as the fiber in pigtail 102 of FIGS. 1B and 2B (hidden in FIGS. 1A, 2A, 8A and 8B). Circles 960, 970 and 980 represent the spot sizes of optical beams of different wavelengths arriving at the fiber. For example, circle 980 represents the spot size w at wavelength $\lambda_l$.

In FIG. 9 the spot sizes 960, 970, 980 for various wavelengths of light arriving the second fiber in a VOA match the mode sizes of that fiber; however, they are not aligned with the positions of the modes of the fiber. Fiber modes for wavelengths corresponding to spots 960, 970 and 980 are represented by dashed circles 560, 570 and 580 respectively. The spots and their corresponding modes are offset by a distance $\delta x + a(\lambda_i - \lambda_0)$; spot 980 is offset by $\delta x + a(\lambda_i - \lambda_0)$, for example.

In FIG. 9 spot 980 and corresponding fiber mode 580 have been filled in with hatching for ease of discussion. It is apparent from the figure that spot 960 and mode 560 overlap somewhat; likewise spot 980 and mode 580 overlap in the same proportion. Therefore the attenuation at the wavelength corresponding to spot 980 is the same as that at the wavelength corresponding to spot 360. The attenuation is constant with wavelength and thus WDL is minimized for at least one value of average attenuation.

Figure 10:
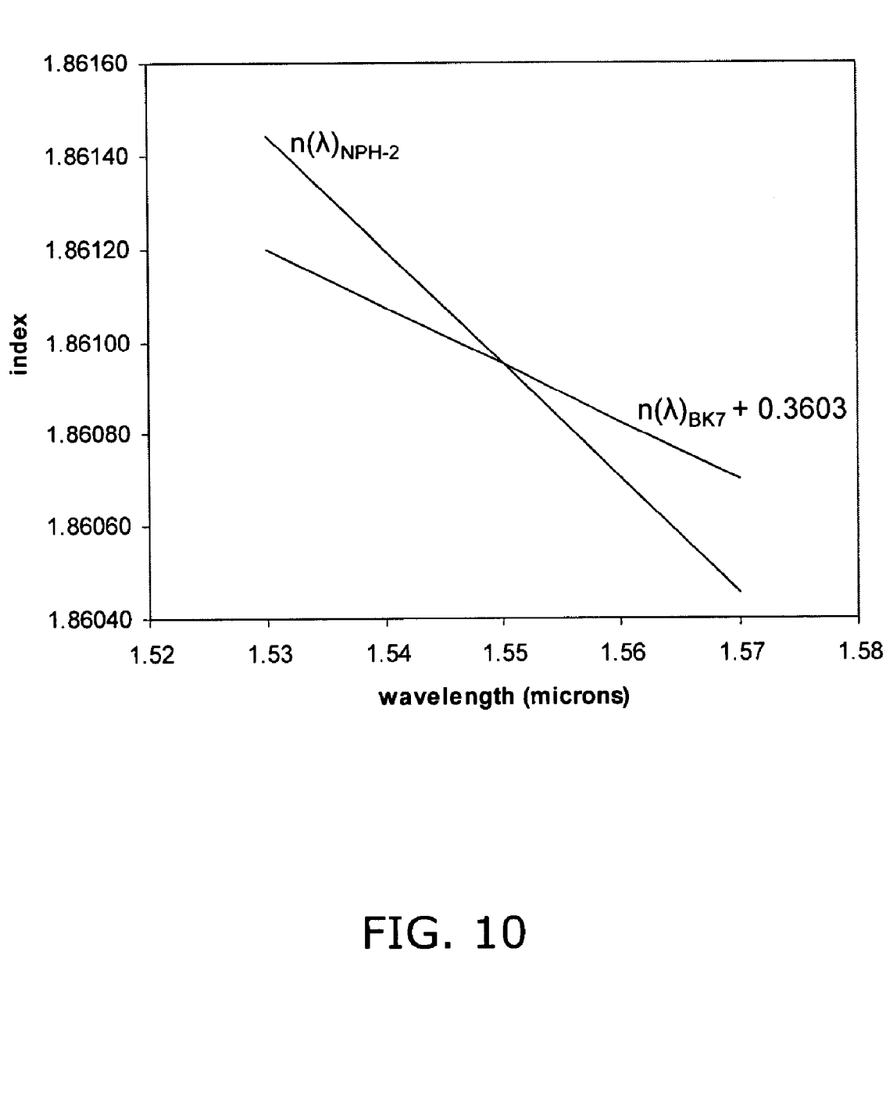
FIG. 10 is a graph of index of refraction versus wavelength for high and low dispersion glasses.

FIG. 10 is a graph of index of refraction versus wavelength for high dispersion glass NPH2 and low dispersion glass BK7. In the figure the index of refraction of NPH2 is plotted versus wavelength. The index of refraction of BK7 is added to a constant (0.3603) before plotting as an aid in visualization. This way the difference in slopes of the index versus wavelength plots are easily seen.

A ray tracing program can be used to determine the location of the return beam for a particular wavelength and mirror angle. Using this program the designer can model the WDL for particular lens materials and angle of the flat face.

Glass NPH2 was used in a working prototype of a WDL-compensated tilting mirror MEMS VOA. FIG. 10 shows that the index of refraction for NPH2 varies from approximately 1.86145 at 1.53 µm wavelength to 1.86045 at 1.57 µm wavelength. This rate of change of index with wavelength is about twice as great as that of low dispersion glass BK7. Over the wavelength range 1.53-1.57 µm, the index of NPH2 varies by approximately 0.001 while that for BK7 varies by approximately 0.0005 Successful design of lens 810 depends on both the use of high dispersion glass and the selection of an appropriate wedge angle, $\theta$.

Figure 11A:
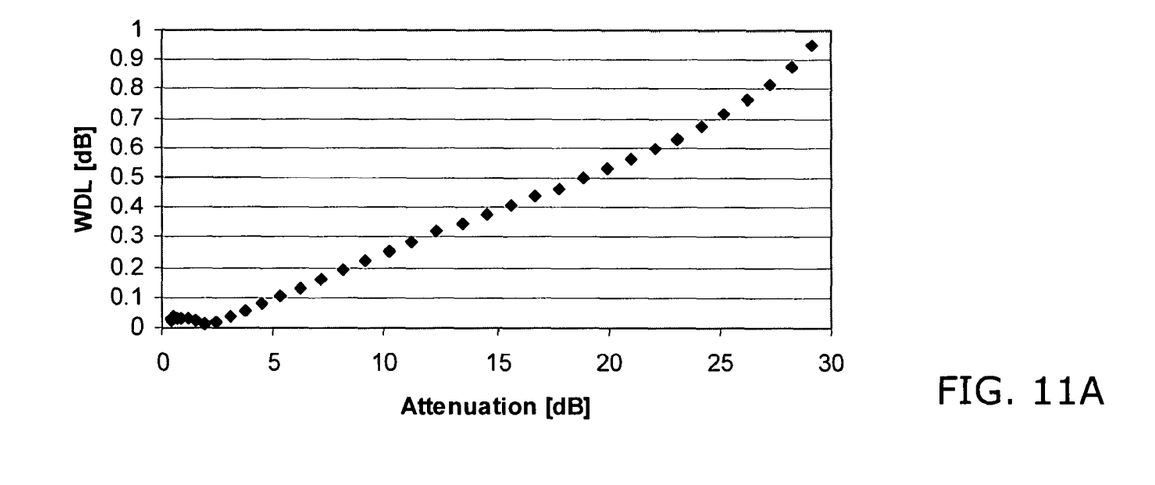
FIGS. 11A and 11B show experimentally measured WDL versus attenuation for two actual VOAs based on a conventional design.
Figure 11B:
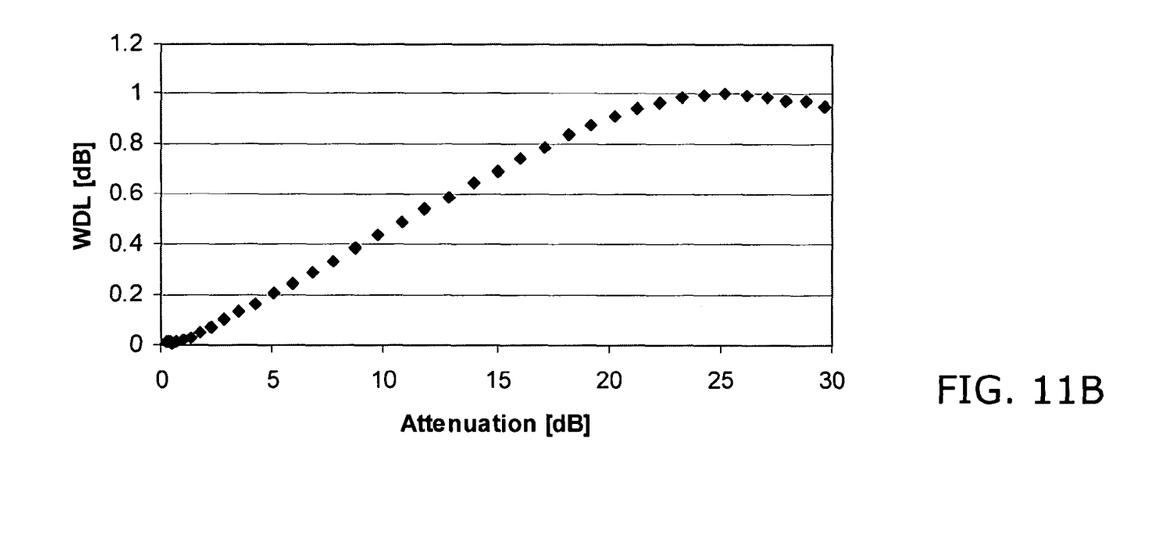

FIGS. 11A and 11B show WDL versus attenuation for two actual VOAs based on conventional designs incorporating a GRIN lens. In the figures it is apparent that the WDL increases as attenuation increases. The minimum WDL occurs at or near zero attenuation. At an overall attenuation of 15 dB, the WDL is 0.4 dB in FIG. 11A, while it is 0.7 dB in FIG. 11B.

Figure 12A:
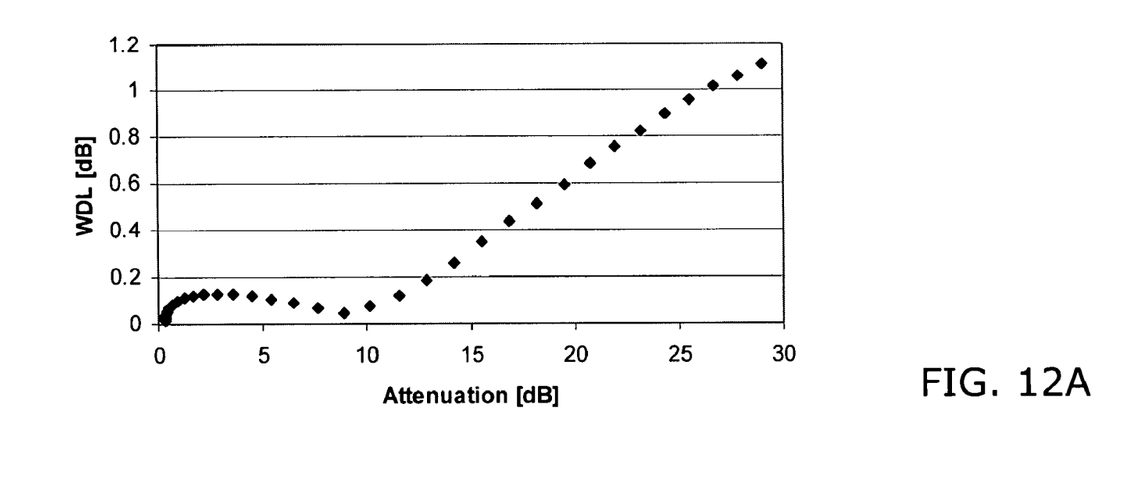
FIGS. 12A and 12B show experimentally measured WDL versus attenuation for two actual VOAs based on a design that minimizes WDL.
Figure 12B:
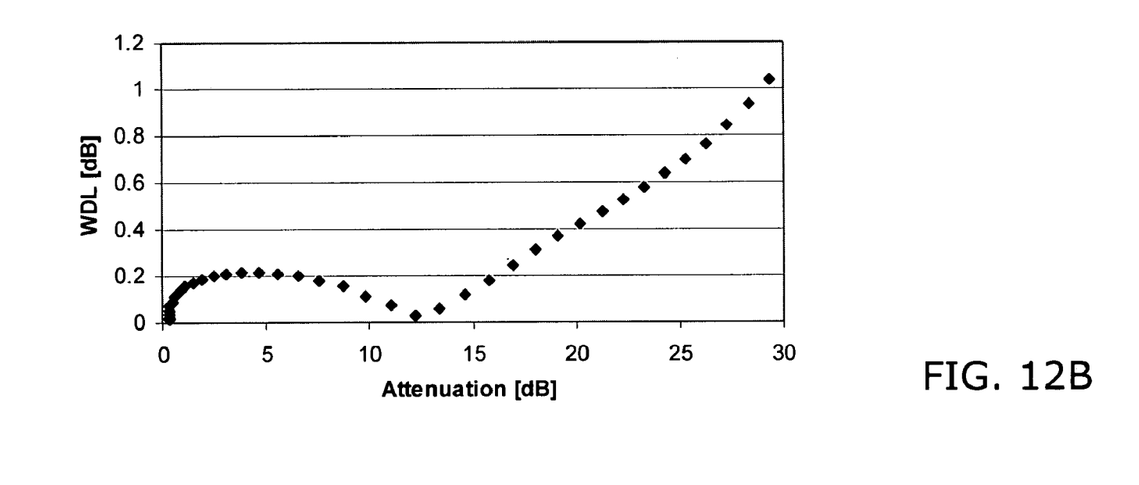

FIGS. 12A and 12B show WDL versus attenuation for two actual VOAs based on a design that minimizes WDL. The attenuators whose WDL characteristics are plotted in FIGS. 12A and 12B comprise lenses made from NPH2 high dispersion glass. In one case (plotted in FIG. 12A) the lens comprises a plane wedged surface that forms an angle (angle $\theta$ in FIGS. 8A and 8B) of ten degrees with a plane perpendicular to the axis of the lens. In another case (plotted in FIG. 12B) the lens comprises a plane wedged surface that forms an angle of twelve degrees with a plane perpendicular to the axis of the lens. In both cases, the lenses are approximately 3.7 mm long and comprise a curved surface whose radius of curvature is approximately 1.8 mm.

In the figures it is apparent that the WDL reaches a local minimum value at an overall attenuation greater than zero. The minimum WDL occurs at approximately 9 dB in FIG. 12A and at approximately 12 dB in FIG. 12B. At an overall attenuation of 15 dB, the WDL is approximately 0.35 dB in FIG. 12A while it is approximately 0.25 dB in FIG. 12B. Furthermore, the wavelength dependent loss is less than 0.3 dB for all attenuations between 0 dB and 15 dB in the wavelength range from 1.53 µm to 1.57 µm in both FIGS. 12A and 12B.

While various example embodiments have been described as operating in the optical C band extending from approximately 1.53 µm to 1.57 µm, clearly other embodiments operating in the optical L band extending from approximately 1.57 µm to 1.61 µm perform the same function and operate in the same way to obtain the same result as the embodiments described herein. In fact, optical attenuators described herein may be designed for any optical wavelength band.

As one skilled in the art will readily appreciate from the disclosure of the present invention, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

While the invention has been described in connection with what are presently considered to be the most practical and preferred embodiments, it is to be understood that the invention is not limited to the disclosed embodiments and alternatives as set forth above, but on the contrary is intended to cover various modifications and equivalent arrangements included within the scope of the following claims.

What is claimed is:

1. A method of producing a variable optical attenuator comprising a first optic fiber, a mirror, a second optical fiber, and a glass lens that comprises a lens axis, a plane wedged surface, and a curved surface, the method comprising:
   selecting an angle for the plane wedge surface relative to the lens axis based on the wavelength dependence of the index of refraction of the glass lens to produce a wavelength dependent loss of less than 0.3 dB for all attenuations between 0 dB and 15 dB in a selected wavelength range and less than 0.1 db for an attenuation between 1 dB and 15 dB in the selected wavelength range,
   wherein the lens comprises a material that has an index of refraction that varies by more than 0.0005 over the wavelength range from 1.53 μm to 1.57 μm or a material that has an index of refraction that varies by more than 0.0005 over the wavelength range from 1.57 μm to 1.61 μm.

2. The method of claim 1 wherein the lens comprises a glass material that has an index of refraction that varies by more than 0.0005 over the wavelength range from 1.53 μm to 1.57 μm.

3. The method of claim 1 wherein the angle is selected by satisfying the equation $a = b \times (A/4.343)^{1/2}$
   wherein,
   "A" is the attenuation,
   "a" is the linear term of the mode size variation as a function of wavelength, which is a function of the wavelength dependence of the index of refraction of the lens material, wavelength range over which attenuation dependent is to be compensated, and wedge angle of the plane wedge surface and
   "b" is the derivative of the fiber mode size with respect to the wavelength at wavelength $\lambda_0$, the center of the optical band.

4. The method of claim 1 wherein the angle of the plane wedged surface is at least ten degrees relative to a plane perpendicular to the lens axis.

5. The method of claim 1 wherein the selected wavelength range is from 1.53 μm to 1.57 μm.

6. The method of claim 1 wherein the selected wavelength range is from 1.57 μm to 1.61 μm.

7. The method of claim 1 wherein the lens comprises a glass that has an index of refraction that varies by more than 0.0005 over the wavelength range from 1.57 μm to 1.61 μm.

8. An optical attenuator comprising:
   a single-element lens comprising a lens axis, a plane wedged surface, and a curved surface;
   a first optical fiber that directs light toward the single-element lens;
   a tilting micro-electro-mechanical mirror that reflects light from the first optical fiber after the light is transmitted through the lens; and
   a second optical fiber that receives light from the lens after the light is reflected from the mirror and retransmitted through the lens;
   wherein the plane wedged surface forms an angle relative to the plane perpendicular to the lens axis,
   wherein the angle is selected based on the refractive index variation as a function of wavelength for the lens material to yield less than 0.1 dB wavelength dependent loss for an attenuation between 1 dB and 15 dB in a selected wavelength range and a wavelength dependent loss of less than 0.3 dB for all attenuations between 0 dB and 15 dB in the selected wavelength range,
   wherein the lens comprises a material that has an index of refraction that varies by more than 0.0005 over the wavelength range from 1.53 μm to 1.57 μm or a material that has an index of refraction that varies by more than 0.0005 over the wavelength range from 1.57 μm to 1.61 μm.

9. The optical attenuator of claim 8 wherein the lens comprises a material that has an index of refraction that varies by more than 0.0005 over the wavelength range from 1.53 μm to 1.57 μm.

10. The optical attenuator of claim 8 wherein the lens comprises NPH2 glass.

11. The optical attenuator of claim 8 wherein the angle of the plane wedged surface relative to a plane perpendicular to the lens axis is at least ten degrees.

12. The optical attenuator of claim 8 wherein the selected wavelength range is from 1.53 μm to 1.57 μm.

13. The optical attenuator of claim 8 wherein the selected wavelength range is from 1.57 μm to 1.61 μm.

14. The optical attenuator of claim 8 wherein the lens comprises the material that has an index of refraction that varies by more than 0.0005 over the wavelength range from 1.57 μm to 1.61 μm.

15. A method of producing a variable optical attenuator comprising:
   determining the parameters of the lens for a reduced wavelength dependent loss of less than 0.1 dB over a range of operating wavelengths and attenuation levels between 1 dB and 15 dB and a wavelength dependent loss of less than 0.3 for all attenuation levels between 0 dB and 15 dB by selecting a lens comprising a material with an index of refraction dependent on the wavelength of light transmitted through the lens material and a plane wedge surface with a wedge angle relative to a plane perpendicular to the lens axis satisfying the mathematical relationship:

$$a = b \times (A/4.343)^{1/2}$$

wherein,
   "A" is the attenuation,
   "a" is the linear term of the mode size variation as a function of wavelength, which is a function of the wavelength dependence of the index of refraction of the lens material, wavelength range over which attenuation dependent is to be compensated, and wedge angle of the plane wedge surface and
   "b" is the derivative of the fiber mode size with respect to the wavelength at wavelength $\lambda_0$, the center of the optical band,
   wherein the lens comprises a material that has an index of refraction that varies by more than 0.0005 over the wavelength range from 1.53 μm to 1.57 μm or wherein the lens comprises a material that has an index of refraction that varies by more than 0.0005 over the wavelength range from 1.57 µm to 1.61 µm.

16. The method of claim 15 wherein the wavelength dependent loss of an attenuation between 0 dB and 15 dB is approximately zero in a selected wavelength range.

17. The method of claim 15 wherein the lens comprises NPH2 glass.

18. The method of claim 15 wherein the wedge angle of the plane wedged surface relative to a plane perpendicular to the lens axis is at least ten degrees.

19. The method of claim 15 wherein the wavelength range is from 1.53 µm to 1.57 µm.

20. The method of claim 15 wherein the wavelength range is from 1.57 µm to 1.61 µm.

* * * * *